S. L. ADLER.
CORSET FITTING CHART.
APPLICATION FILED MAR. 10, 1910.
1,023,060.
Patented Apr. 9, 1912.
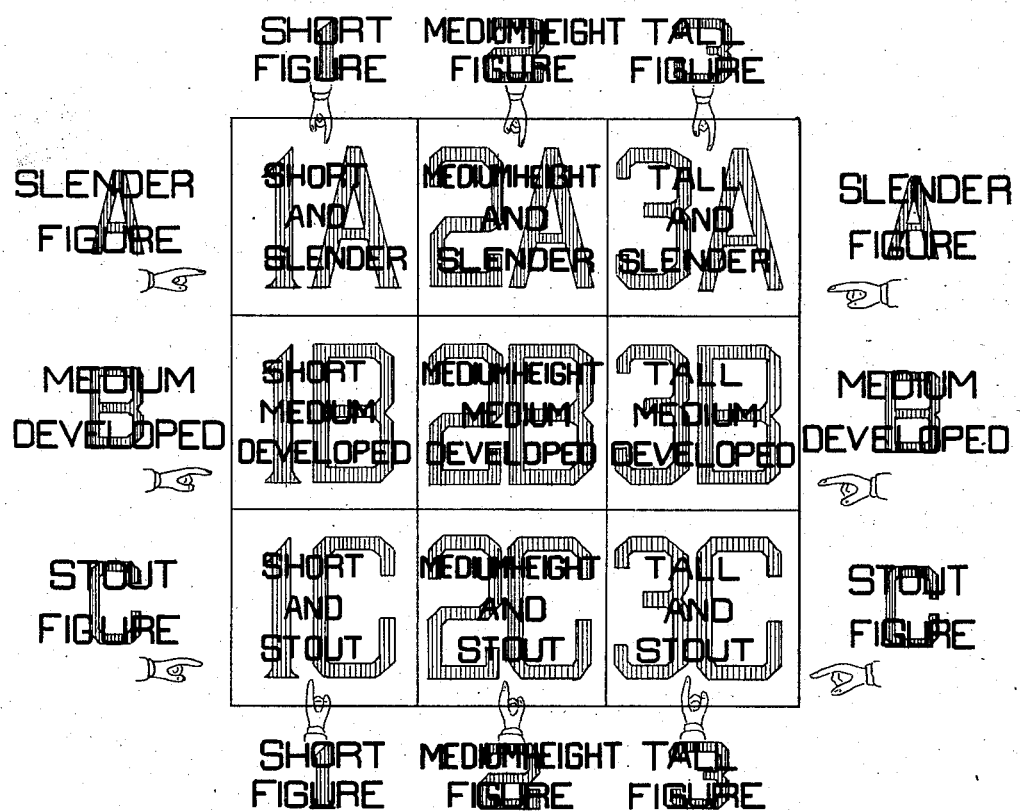
WITNESSES:
INVENTOR
ATTORNEY.
COLUMBIA PLANOGRAPH CO., WASHINGTON, D. C.

UNITED STATES PATENT OFFICE.

SIGISMUND L. ADLER, OF NEW YORK, N. Y.

CORSET-FITTING CHART.

1,023,060.

Specification of Letters Patent.   Patented Apr. 9, 1912.

Application filed March 10, 1910. Serial No. 548,415.

*To all whom it may concern:*

Be it known that I, SIGISMUND L. ADLER, a citizen of the United States, residing at New York, in the county of New York and State of New York, have invented certain new and useful Improvements in Corset-Fitting Charts, of which the following is a specification, reference being had therein to the accompanying drawing.

My invention relates especially to devices employed for fitting corsets, and has for its object the provision of a chart whereby the salesman or purchaser can determine at a glance the style of corset required by a purchaser.

To attain the desired end, my invention consists in a chart having certain novel and useful arrangements of indicating numerals and description of figures thereon, all of which will be hereinafter first fully described, and then pointed out in the claim.

The drawing shows an illustration of my corset fitting chart.

My invention consists in a chart divided into squares, and having printed thereon large numerals and letters designating the corset required to fit certain figures. In practice these numerals and letters are printed in a color, such as red, and in each square over the first mentioned numerals and letters are printed other letters describing the particular figure represented by the said numerals and letters; at each side of each row of the square is printed the indicating letters and description of figure, and above and below the said squares the indicating numerals of that column of squares and height of figure is printed.

A represents the slender figure; B the medium developed figure, and C the stout figure.

1 represents the short figure; 2 the medium height, and 3 the tall figure.

In employing this chart in buying or selling corsets, the salesman or purchaser needs only the waist measurement, and at a glance can determine from the chart the necessary corset to accurately and comfortably fit the purchaser.

Having now fully described my invention, what I claim as new therein and desire to secure by Letters Patent, is:

The herein described corset fitting chart comprising a surface having a table of vertically and horizontally arranged figures printed thereon, each of the said figures comprising two characters, one of which refers to the height of the figure to be fitted, while the opposite character refers to the development of the figure to be fitted, the first mentioned height indicating characters progressing horizontally and remaining the same in the vertical columns, while the second mentioned development indicating characters progress vertically and remain the same in all horizontal columns, and keys to the different characters printed upon the surface at the margin of the table opposite to the ends of those columns in which the characters remain unchanged.

In testimony whereof I hereto affix my signature in presence of two witnesses.

SIGISMUND L. ADLER.

Witnesses:
F. A. CHICKERING,
A. M. PIERCE.

Copies of this patent may be obtained for five cents each, by addressing the "Commissioner of Patents, Washington, D. C."